US008774476B2

(12) United States Patent
Urushiya

(10) Patent No.: US 8,774,476 B2
(45) Date of Patent: Jul. 8, 2014

(54) IMAGE PROCESSING APPARATUS AND IMAGE PROCESSING METHOD

(71) Applicant: Canon Kabushiki Kaisha, Tokyo (JP)

(72) Inventor: Hiroyuki Urushiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/784,562

(22) Filed: Mar. 4, 2013

(65) Prior Publication Data
US 2013/0182923 A1 Jul. 18, 2013

Related U.S. Application Data

(63) Continuation of application No. 12/433,716, filed on Apr. 30, 2009, now Pat. No. 8,411,918.

(30) Foreign Application Priority Data

May 13, 2008 (JP) ................................. 2008-126444

(51) Int. Cl.
G06K 9/46 (2006.01)
(52) U.S. Cl.
USPC ........................................................ 382/128
(58) Field of Classification Search
USPC .......................................... 382/128–132, 165
See application file for complete search history.

(56) References Cited

U.S. PATENT DOCUMENTS

| 5,790,692 | A * | 8/1998 | Price et al. | 382/133 |
|---|---|---|---|---|
| 7,567,693 | B2 * | 7/2009 | deCharms | 382/128 |
| 7,576,844 | B2 * | 8/2009 | Hairston et al. | 356/73 |
| 7,587,076 | B2 * | 9/2009 | Kraus et al. | 382/128 |
| 7,590,270 | B2 * | 9/2009 | Asbeck et al. | 382/128 |
| 2002/0102018 | A1 * | 8/2002 | Lin et al. | 382/165 |
| 2006/0039526 | A1 * | 2/2006 | Urushiya | 378/4 |
| 2006/0127880 | A1 * | 6/2006 | Harris et al. | 435/4 |
| 2008/0008374 | A1 * | 1/2008 | Urushiya | 382/131 |
| 2009/0214100 | A1 * | 8/2009 | Urushiya | 382/132 |
| 2013/0287280 | A1 * | 10/2013 | Ekin et al. | 382/131 |

* cited by examiner

Primary Examiner — Nathan Ha
(74) Attorney, Agent, or Firm — Canon U.S.A., Inc. IP Division

(57) ABSTRACT

A system control unit causes a diagnosis monitor to display a plurality of sample images generated by changing one or more image processing parameters used in image processing of an X-ray image. When an operator designates a mixing ratio, at which the sample images are mixed, after the plurality of sample images are displayed on the diagnosis monitor, the system control unit sets one or more image processing parameters to be used when image processing of an X-ray image is performed based on the designated mixing ratio. An image processing unit performs image processing of an X-ray image input from an image input unit based on the set image processing parameter.

10 Claims, 13 Drawing Sheets

CONVERSION TABLE

IMAGE PROCESSING APPARATUS AND IMAGE PROCESSING METHOD

CROSS REFERENCE TO RELATED APPLICATIONS

The present application is a continuation of U.S. patent application Ser. No. 12/433,716, filed Apr. 30, 2009, entitled "IMAGE PROCESSING APPARATUS AND IMAGE PROCESSING METHOD", the content of which is expressly incorporated by reference herein in its entirety. Further, the present continuation application claims priority from Japanese Patent Application No. 2008-126444 filed May 13, 2008, which is also hereby incorporated by reference herein in its entirety.

BACKGROUND OF THE INVENTION

1. Field of the Invention

The present invention relates to an image processing apparatus for performing image processing on an image and an image processing method thereof.

2. Description of the Related Art

Generally in an image processing system, when a new image is created by performing various image processing on an image, an image processing parameter must be set for each image processing operation. In this case, when image processing parameters are not appropriately set, an image desired by an operator cannot be obtained. More particularly, in image processing of an X-ray image, image processing parameters that are most effective for diagnosis must be set. However, it is very difficult to set such image processing parameters.

In order to obtain better images, it is necessary to perform so many image processing operations. Thus, the number of combinations of image processing parameters used at that time is large. In addition, it takes very long time to obtain a desired parameter from among the large number of combinations of the image processing parameters through trial and error. Thus, the work is very hard for an operator.

To solve such a problem, for example, Japanese Patent Publication Nos. 7-43773 and 7-104914 discuss conventional techniques for creating and presenting some sample images on which image processing is preliminarily performed, and for selecting one of the presented sample images. According to the conventional techniques, sample images on which complex image processing is preliminarily performed are presented. Thus, even when an operator does not concretely know about the image processing at all, the operator can set appropriate image processing parameters by selecting one of the presented sample images, which is closest to an image to be obtained.

However, images to be desired by an operator can include various images. According to the conventional techniques, a sample image that is exactly matched with an image desired by an operator is not necessarily prepared.

At that time, when all images assumed to be desired by an operator are prepared, image processing corresponding to each of all combinations of image processing parameters should be performed. Thus, the number of sample images to be prepared is huge. In this case, an operator should perform very troublesome operations in order to select an image from a huge number of sample images. Consequently, the work by an operator is increased.

More particularly, for an X-ray image, image processing parameters are set for obtaining an X-ray image suitable for diagnosis. However, an X-ray image to be processed changes based on photographing conditions for photographing the X-ray image. Accordingly, for an X-ray image, it is necessary to change photographing conditions together with image processing parameters set suitable for diagnosis.

There are the following limiting conditions for an X-ray image to be used for diagnosis. One limiting condition is that whoever patients are examined, a density of an X-ray image at a specific position of a patient to be examined must be substantially similar to a density of an X-ray image at the similar position of other patients to be examined. Another limiting condition is that sufficient contrast must be obtained over the entire image of a patient. However, if image processing parameters are simply changed, the limiting conditions cannot be satisfied.

The present invention is accomplished in view of the above problems.

SUMMARY OF THE INVENTION

The present invention is directed to an image processing apparatus and an image processing method that enable an operator to obtain a desired image with a simple operation.

According to an aspect of the present invention, an image processing apparatus for performing image processing on an image to be processed includes a display control unit configured to display on a display unit a plurality of sample images generated by changing one or more image processing parameters to be used when the image processing is performed, a setting unit configured to set, after the plurality of sample images are displayed on the display unit, image processing parameters which are used when the image processing of the image is performed based on a mixing ratio designated by an operator, at which the sample images are mixed, and an image processing unit configured to perform the image processing of the image based on the image processing parameters set by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In the following description, an example of employing an X-ray image as an image to be processed is described.

Figure 1:
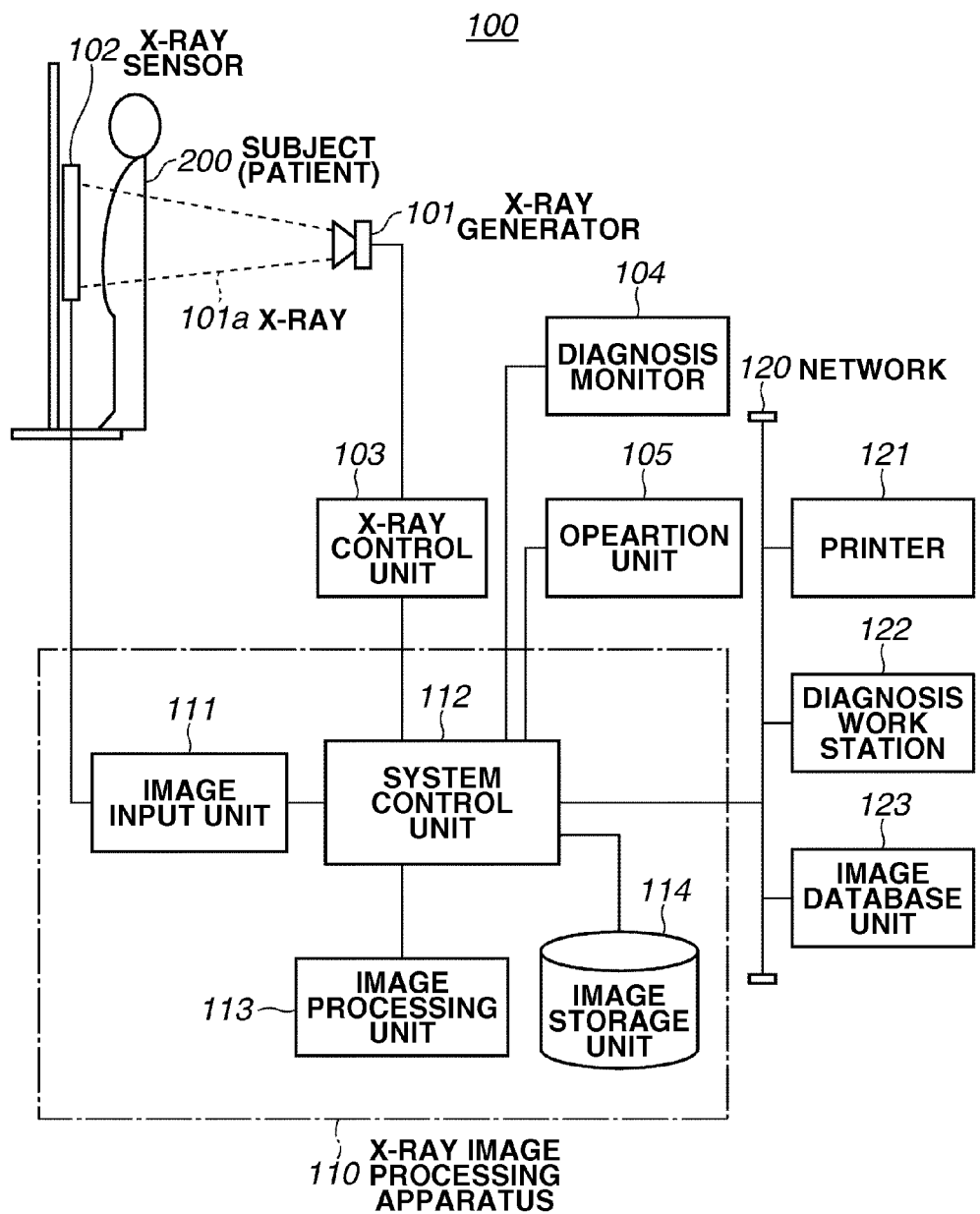
FIG. 1 schematically illustrates a configuration of an X-ray image processing system according to an exemplary embodiment of the present invention.

FIG. 1 schematically illustrates a configuration of an X-ray image processing system according to an exemplary embodiment of the present invention. An X-ray image processing system 100 illustrated in FIG. 1 includes an X-ray generator 101, an X-ray sensor 102, an X-ray control unit 103, a diagnosis monitor 104, an operation unit 105, an X-ray image processing apparatus 110, a network 120, and various components connected to the network 120.

More specifically, the various components connected to the network 120 include a printer 121, a diagnosis work station 122, and an image database unit 123. An image input unit 111, a system control unit 112, an image processing unit 113, and an image storage unit 114 are provided in the X-ray image processing apparatus 110.

When a subject (a patient) 200 is present between the X-ray generator 101 and the X-ray sensor 102, the X-ray generator 101 irradiates the subject 200 with an X-ray 101a, which is a kind of radiation. More specifically, the X-ray generator 101 includes an X-ray tube for generating X-rays 101a. Conditions of X-rays 101a irradiated from the X-ray generator 101 are controlled by the X-ray control unit 103.

The X-ray sensor 102 serves as an imaging unit for detecting the X-ray 101a which is irradiated from the X-ray generator 101 and transmitted through the subject 200, and for imaging the subject 200. More specifically, the X-ray sensor 102 performs imaging of an image of the subject 200, based on the X-rays 101a transmitted through the subject 200 and outputs a digital X-ray image. Subsequently, this digital X-ray image is input to the image input unit 111 of the X-ray image processing apparatus 110.

The X-ray control unit 103 sends an X-ray irradiation signal to the X-ray generator 101 under the control of the system control unit 112 of the X-ray image processing apparatus 110 to thereby control the X-ray 101a irradiated from the X-ray generator 101.

The diagnosis monitor 104 serves as a display unit for displaying an X-ray image processed by the X-ray image processing apparatus 110 and various information under the control of the system control unit 112 of the X-ray image processing apparatus 110. The operation unit 105 is operated when an operator (user) gives various instructions to the X-ray image processing apparatus 110. The operation unit 105 can input various instructions to the system control unit 112 of the X-ray image processing apparatus 110.

The X-ray image processing apparatus 110 performs processing of an X-ray image. More specifically, the image input unit 111 of the X-ray image processing apparatus 110 performs inputting of a digital X-ray image output from the X-ray sensor 102 into the X-ray image processing apparatus 110. The system control unit 112 of the X-ray image processing apparatus 110 totally controls an operation of the X-ray image processing system 100. The system control unit 112 controls each unit of the X-ray image processing system 100 when needed.

The image processing unit 113 of the X-ray image processing apparatus 110 performs various image processing, such as correction processing for the X-ray sensor 102, gradation processing, sharpening processing, and dynamic range compression processing, on an X-ray image input from the image input unit 111, based on set image processing parameters.

The image storage unit 114 of the X-ray image processing apparatus 110 stores various images, such as a digital X-ray image input from the image input unit 111 and a digital X-ray image processed by the image processing unit 113, under the control of the system control unit 112.

The system control unit 112 controls storage of a digital X-ray image processed by the image processing unit 113 and display of the digital X-ray image on the diagnostic monitor 104. The system control unit 112 outputs a digital X-ray image processed by the image processing unit 113 to the printer 121, the diagnosis work station 122, and the image database unit 123 via the network 120 when needed.

When an operator inputs a change instruction via the operation unit 105 because an X-ray image displayed or output is unsatisfactory, the system control unit 112 controls image processing by changing the image processing parameters and displays and outputs a processed X-ray image.

Figure 2:
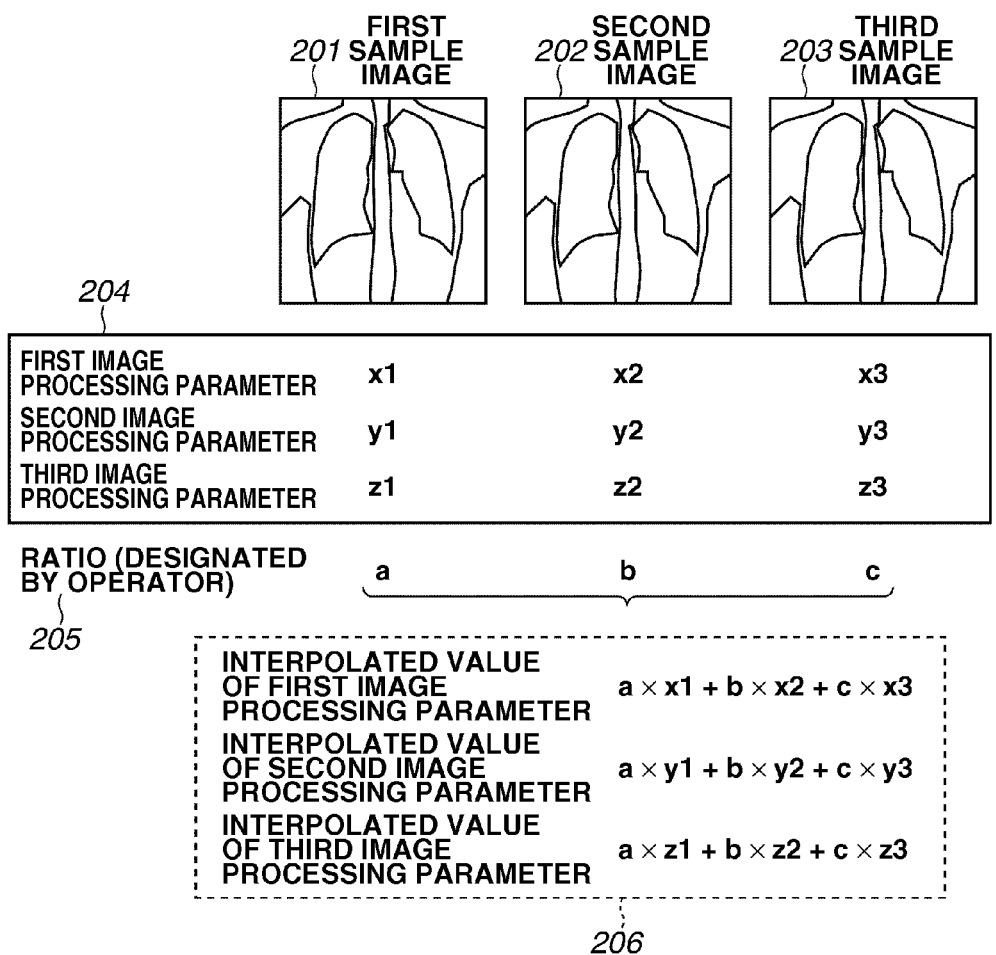
FIG. 2 illustrates an example of setting image processing parameters in an X-ray image processing apparatus according to the exemplary embodiment of the present invention.

FIG. 2 illustrates an example of setting image processing parameters in the X-ray image processing apparatus 110 according to the exemplary embodiment of the present invention.

A first sample image 201, a second sample image 202 and a third sample image 203 illustrated in FIG. 2 are obtained by assuming several X-ray images to be desired by an operator, and by preliminarily determining image processing parameters corresponding to the above X-ray images respectively, and then by applying the image processing parameters to the images. These sample images 201 through 203 are stored in the image storage unit 114 (or the image database unit 123) and displayed on the diagnosis monitor 104 by the system control unit 112.

When one of these sample images 201 through 203 is exactly matched with an image desired by an operator, the operator instructs the X-ray image processing apparatus 110 via the operation unit 105 to select the sample image exactly matched with the desired image. In this case, the image processing unit 113 performs image processing on an X-ray image input from the image input unit 111 under the control of the system control unit 112 using image processing parameters corresponding to the selected sample image.

When none of the sample images 201 through 203 are matched with the desired image, the operator designates a mixing ratio of sample images in order to obtain the desired image by mixing the sample images at the designated mixing ratio. Then, the X-ray image processing apparatus 110 performs interpolation of each of the image processing parameters based on the operator-designated mixing ratio. The interpolation of each of the image processing parameters is performed independently from each other.

FIG. 2 illustrates an example of adjusting values of image processing parameters using three types of sample images. On each of the sample images, different image processing based on the different parameters is performed. In the example illustrated in FIG. 2, a set of image processing parameters 204, which corresponds to the three types of image processing, includes a first image processing parameter, a second image processing parameter, and a third image processing parameter. In this example, the first image processing parameter, the second image processing parameter and the third image processing parameter corresponding to a first sample image 201 have values x1, y1, and z1, respectively. Similarly, the first image processing parameter, the second image processing parameter and the third image processing parameter corresponding to a sample image No. N (N=2, 3), i.e., corresponding to an N-th sample image are preliminarily set at values of xN, yN, and zN, respectively.

In the example illustrated in FIG. 2, the operator-designated mixing ratio among the first sample image 201, the second sample image 202 and the third sample image 203 is set to be a:b:c such that a sum of a first term a, a second term b and a third term c respectively corresponding to the first sample image 201, the second sample image 202 and the third sample image 203 is equal to 1 (i.e., a+b+c=1). When the interpolation for each of the image processing parameters 204 is performed, the following interpolated image processing parameters 206 are obtained.

More particularly, when the interpolation for the first image processing parameter is performed, the interpolated first image processing parameter is a×x1+b×x2+c×x3. Similarly, when the interpolation of the second image processing parameter is performed, the interpolated second image processing parameter is a×y1+b×y2+c×y3. In addition, when the interpolation for the second image processing parameter is performed, the interpolated second image processing parameter is a×z1+b×z2+c×z3.

When the number of sample images used at the designation of the mixing ratio is two or more, similar processing can be performed. Further, whatever the number of the image processing parameters is, similar processing can be performed.

Figure 3:
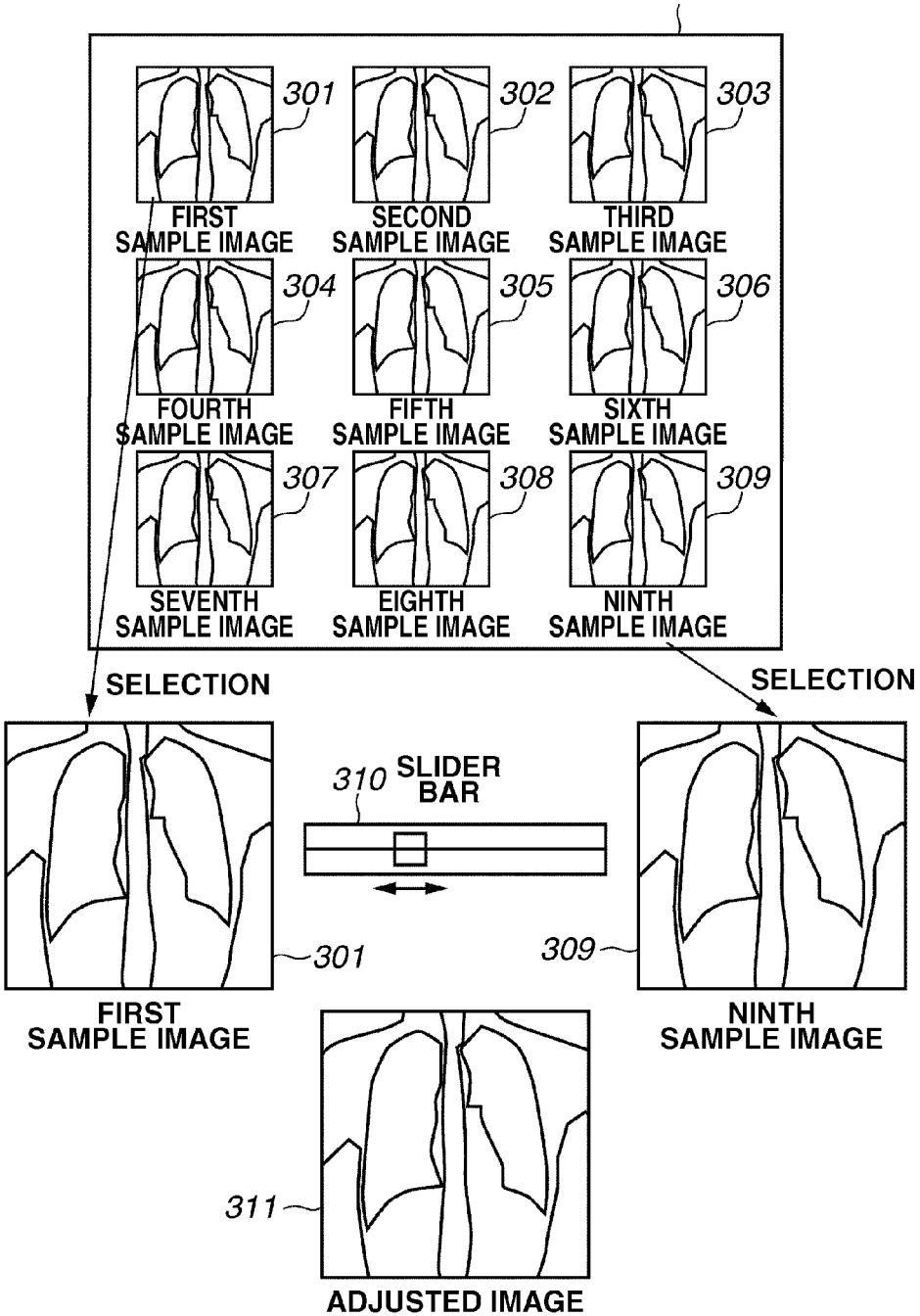
FIG. 3 illustrates another example of setting image processing parameters in the X-ray image processing apparatus according to the exemplary embodiment of the present invention.

FIG. 3 conceptually illustrates another example of setting image processing parameters in the X-ray image processing apparatus 110 according to the present embodiment of the present invention. In the example illustrated in FIG. 3, a plurality of sample images, more specifically, two sample images are selected from among two or more sample images. Then, the image processing parameters are set using the two selected sample images.

The sample image database illustrated in FIG. 3 includes a plurality of sample images prepared as images assumed to be desired by an operator obtained by variously changing the image processing parameters, and is stored in the image storage unit 114. The sample image database illustrated in FIG. 3 can be stored in the image database unit 123.

FIG. 3 illustrates the example in which nine sample images, i.e., a first sample image 301 through a ninth sample image 309 stored in the sample image database are displayed on the diagnosis monitor 104 by being juxtaposed in a matrix form thereon.

Then, an operator selects two sample images closest to the desired image from nine sample images displayed on the diagnosis monitor 104 using the operation unit 105. FIG. 3 illustrates the example of selecting two sample images, i.e., the first sample image 301 and the ninth sample image 309 as the sample image selected by the operator. The selected two sample images are displayed side-by-side on the diagnosis monitor 104.

Then, the operator designates a mixing ratio between the two sample images (selected sample images) using a slider bar 310 to obtain the desired image. The slider bar 310 is displayed together with the sample images on the diagnosis monitor 104. The operator can move the slider bar 310 displayed on the diagnosis monitor 104 using the operation unit 105.

When the slider bar 310 is positioned at a left end (see FIG. 3), the mixing ratio of the first sample image 301 to the ninth sample image 309 is 1:0. When the slider bar 310 is positioned at a right end (see FIG. 3), the mixing ratio of the first sample image 301 to the ninth sample image 309 is 0:1. When the slider bar 310 is positioned at a middle position between the left end and the right end, as illustrated in FIG. 3, the mixing ratio of the first sample image 301 to the ninth sample image 309 is determined according to the position of the slider bar 310.

Then, the X-ray image processing apparatus 110 performs interpolation for the image processing parameters based on the designated mixing ratio between the sample images to thereby set new image processing parameters. Next, the X-ray image processing apparatus 110 performs image processing using the newly set image processing parameters thereby to create a new sample image and to display the new sample image on the diagnosis monitor 104. FIG. 3 illustrates the newly created sample image displayed as an adjusted image 311.

The mixing ratio between the selected sample images is changed each time the operator changes the designated position of the slider bar 310 illustrated in FIG. 3 using the operation unit 105. Each time the designated position of the slider bar 310 is changed, the X-ray image processing apparatus 110 performs control operations for updating the mixing ratio between the selected sample images, recreating the adjusted image 311 and displaying the recreated image on the diagnosis monitor 104.

The operator can determine an image closest to the desired image by observing the adjust image 311 which is changed by changing the position of the slider bar 310. When the operator determines that the adjusted image 311 displayed on the diagnosis monitor 104 is matched with the desired image, the operator gives the X-ray image processing apparatus 110 a permission to set the image processing parameters. In this case, the X-ray image processing apparatus 110 sets the image processing parameters interpolated based on the mixing ratio between the sample images, which corresponds to the position of the slider bar 310, as the parameters to be used when image processing of an X-ray image is performed.

Hereinafter, an example procedure for performing X-ray image processing by the X-ray image processing apparatus 110 is described with reference to FIG. 3. The first sample image 301 through the ninth sample image 309 illustrated in FIG. 3 are assumed to be preliminarily stored in the image storage unit 114. When the process illustrated in FIG. 2 is applied to this example, the first sample 301 through the third sample image 303 are assumed to be preliminarily stored in the image storage unit 114.

First, the system control unit 112 performs a control operation (corresponding to a display control step) of displaying the first sample image 301 through the ninth sample image 309 preliminarily stored in the image storage unit 114 on the diagnosis monitor 104 serving as the display unit. The system control unit 112 constitutes the display control unit. At that time, a plurality of sample images displayed on the diagnosis monitor 104 are images generated by image processing performed by the image processing unit 113 by changing the image processing parameters.

Subsequently, when the operator selects sample images via the operation unit 105, the system control unit 112 performs a control operation (corresponding to an image selection processing step) for selecting a plurality of sample images from two or more sample images displayed on the diagnosis monitor 104 based on the selection performed by the operator. The system control unit 112 for performing the selection of the sample images corresponds to image selection processing unit. Then, the system control unit 112 performs a control operation for displaying on the diagnosis monitor 104 the plurality of selected sample images subjected to the selection processing. More specifically, as illustrated in FIG. 3, the first sample image 301 and the ninth sample image 309 are selected from among the first sample image 301 through the ninth sample image 309 and displayed as the plurality of selected sample images, as described above.

Next, when the operator designates a position of the slider bar 310 the system control unit 112 sets the image processing parameters based on the mixing ratio between the selected sample images (i.e., the selected sample images 301 and 309) (corresponding to a setting step). More specifically, the system control unit 112 sets the image processing parameters based on the designated mixing ratio using the image processing parameters each of which has values respectively corresponding to the selective sample images 301 and 309. This setting of the image processing parameters can be performed by the image processing unit 113. The system control unit 112 (or the image processing unit 113), which performs this setting of the image processing parameters, corresponds to the setting unit.

Subsequently, the image processing unit 113 generates an adjusted image 311, which is a new sample image, by performing image processing using the image processing parameters set based on the mixing ratio between the sample images, which is designated using the slider bar 310. Then, the system control unit 112 performs a control operation for displaying the adjusted image 311, which is generated by the image processing unit 113, on the diagnosis monitor 104.

When the operator determines that the adjusted image 311 displayed on the diagnosis monitor 104 is matched with the desired image and gives a permission to the setting of the image processing parameters via the operation unit 105, the system control unit 112 detects this permission. Then, the image processing unit 113 performs image processing of an X-ray image, which is input from the image input unit 111 and serves as a target image to be processed, under the control of the system control unit 112 based on the image processing parameters used when the adjusted image 311 is generated.

On the other hand, when the operator determines that the adjusted image 311 displayed on the diagnosis monitor 104 is not matched with the desired image and changes the designated position of the slider bar 310, the mixing ratio between the selected sample images 301 and 309 is changed. In this case, the system control unit 112 sets the image processing parameters according to the change of the mixing ratio between the selective sample images 301 and 309 each time the mixing ratio is changed.

Then, in this case, at each setting of the image processing parameters, the image processing unit 113 generates an adjusted image, which is a new sample image, according to the image processing parameters. Then, the system control unit 112 performs a control operation for displaying on the diagnosis monitor 104 the adjusted image generated by the image processing unit 113. This sequence of operations is performed until the operator gives permission.

The image processing parameters having hitherto been described are assumed to be independent of one another. However, sometimes, the image processing parameters are not independent of one another. That is, image processing parameters used for image processing performed by the image processing unit 113 include a plurality of processing parameters interrelated to one another. An example of such a case is described below with reference to FIG. 4.

Figure 4:
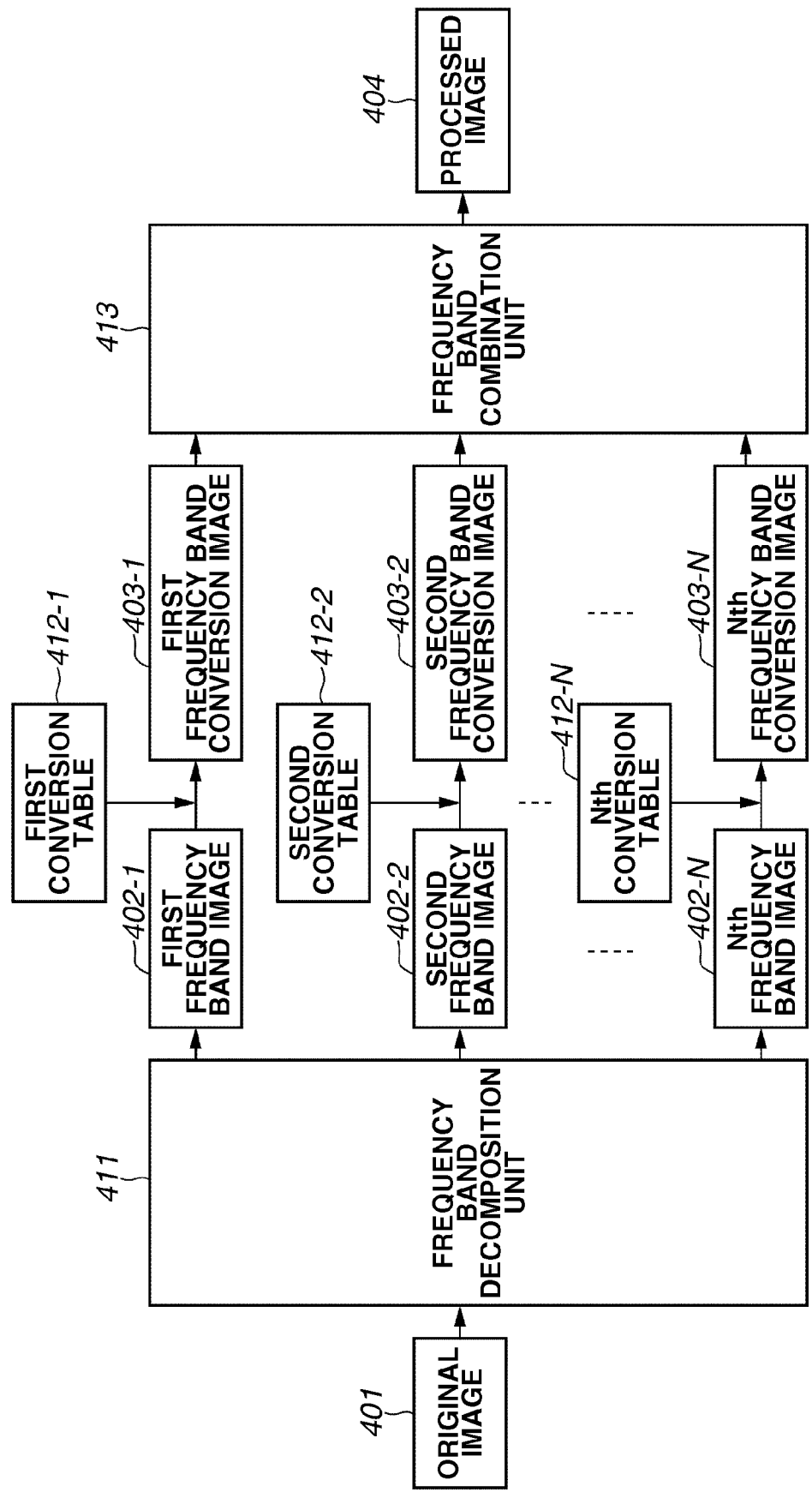
FIG. 4 illustrates an example of image processing performed in the X-ray image processing apparatus according to the exemplary embodiment of the present invention.

FIG. 4 schematically illustrates an example of image processing performed in the X-ray image processing apparatus 110 according to the present embodiment. More specifically, FIG. 4 illustrates an example of performing enhancement processing utilizing multi-frequency processing as image processing.

First, the image processing unit 113 decomposes an original image 401 to be subjected to the enhancement processing into a plurality of frequency band images (i.e., a first frequency band image 402-1 through an N-th frequency band image 402-N) using a frequency band decomposition unit 411. Each of the first frequency band image 402-1 through the N-th frequency band image 402-N, into which the original image 401 is decomposed, is an image which has frequency coefficients for each frequency band as pixel values.

Then, the image processing unit 113 converts each of the first frequency band image 402-1 through the N-th frequency band image 402-N by using conversion tables (i.e., a first conversion table 412-1 through an N-th conversion table 412-N (hereinafter sometimes referred to as a conversion table 412)). Consequently, frequency band conversion images (i.e., a first frequency band conversion image 403-1 through an N-th frequency band conversion image 403-N) are generated.

Then, the image processing unit 113 can generate a processed image 404 subjected to the enhancement processing by causing a frequency band combination unit 413 to combine the first frequency band conversion image 403-1 through the N-th frequency band conversion image 403-N by applying inversion of frequency decomposition thereto.

Image quality of the processed image 404 obtained by the enhancement processing utilizing such multi-frequency processing is determined according to what conversion table 412 is used. Image processing parameters are determined by this conversion table 412. Similar to the above example, the setting of the image processing parameters is performed by the system control unit 112 (or the image processing unit 113).

Figure 5:
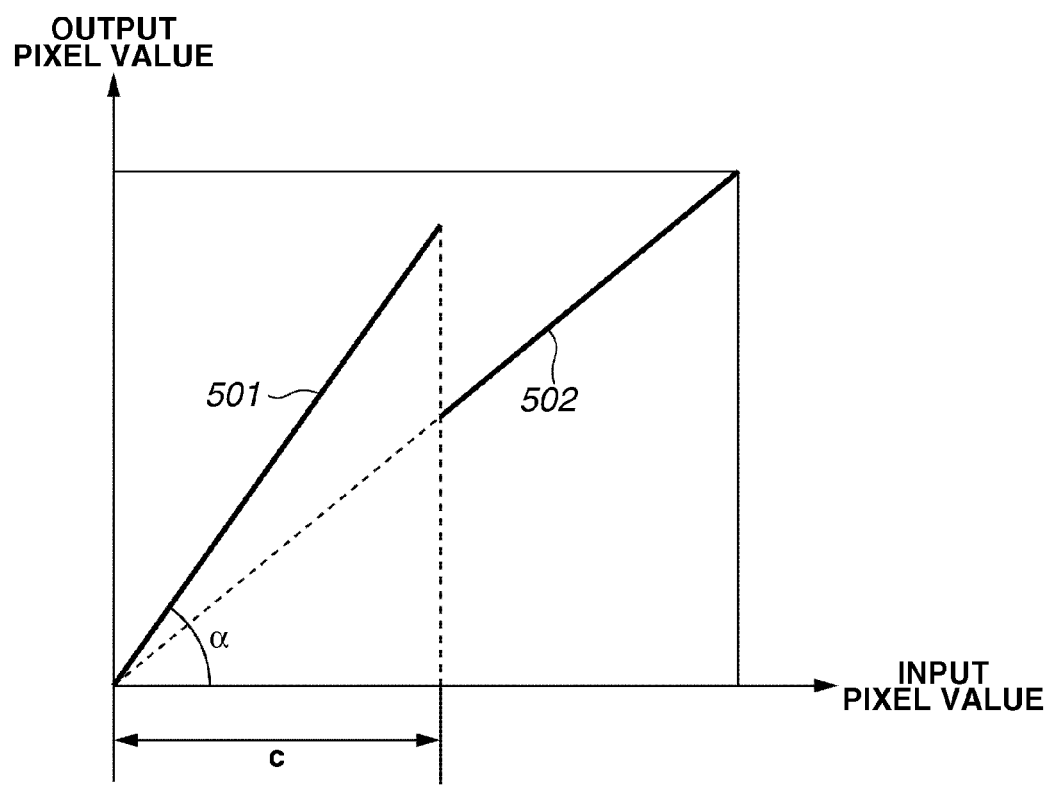
FIG. 5 illustrates an example of contents of a conversion table illustrated in FIG. 4.

FIGS. 5, 6A, 6B and 6C schematically illustrate examples of contents of the conversion table 412. An axis of abscissas of the conversion table 412 illustrated in FIG. 5 represents an input pixel value. An axis of ordinate in FIG. 5 represents an output pixel value obtained by conversion.

In the conversion table 412 illustrated in FIG. 5, a straight line 502 has an inclination of 1. This means that conversion is not performed. On the other hand, a straight line 501 has an inclination of tan $\alpha$ (>1). Thus, the output pixel value obtained by the conversion is larger than the input pixel value.

Consequently, a frequency band corresponding to the input pixel value (thus, an associated frequency band image) is enhanced.

In a range in which the input pixel value does not exceed a predetermined value c, a conversion corresponding to the straight line 501 is performed. On the other hand, in a range in which the input value exceeds the predetermined value c, a conversion corresponding to the straight line 502 is performed (i.e., conversion is not performed). This means that the range in which each input pixel value does not exceed the predetermined value c is a range in which frequency coefficients directly affects the enhancement of the frequency band. In addition, in the range in which each input pixel value exceeds the predetermined value c, an associated frequency band image is regarded to have enough edge components and is not enhanced. Consequently, occurrence of an artifact, such as an overshooting phenomenon, can be prevented.

Thus, the image processing parameters included in the conversion tables 412 for the enhancement of the frequency band include two predetermined parameters, i.e., the inclination (tan α) of the straight line 501, and the predetermined value c. These parameters tan α and c are interrelated to each other. Accordingly, the parameters tan α and c cannot be set independently of each other.

Figure 6A:
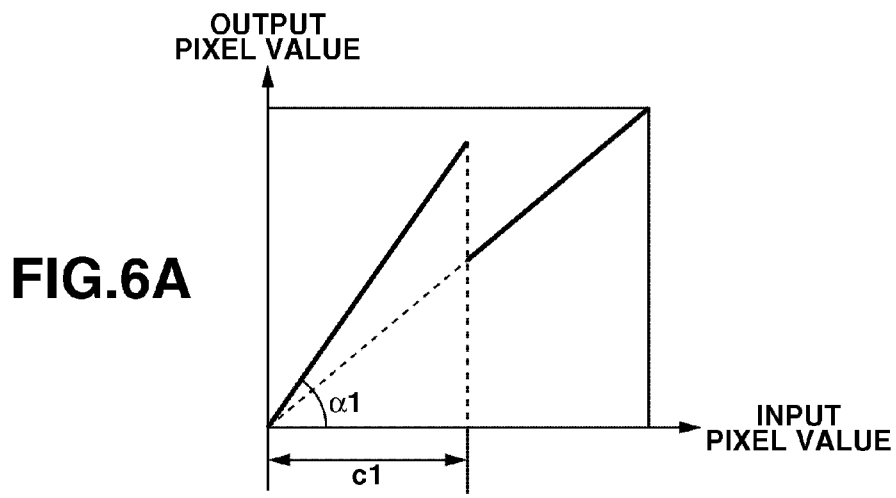
FIGS. 6A, 6B, and 6C each illustrate an example of the contents of the conversion table illustrated in FIG. 4.
Figure 6B:
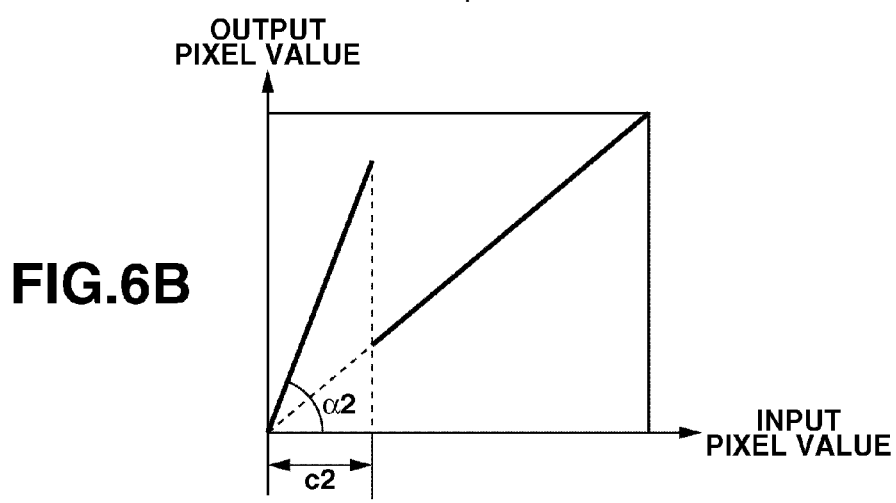
Figure 6C:
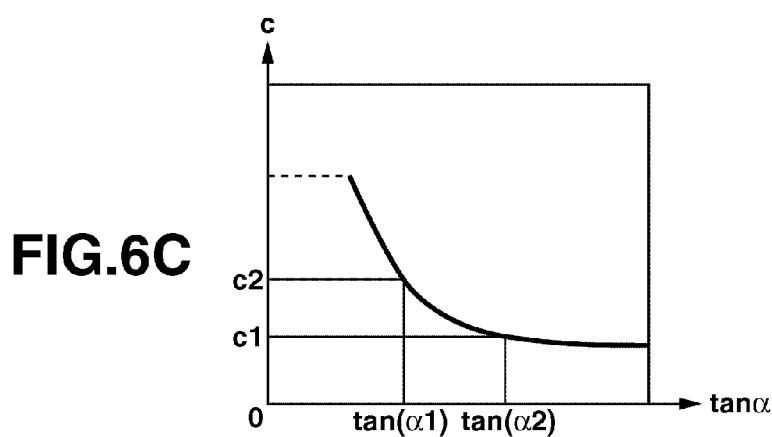

More specifically, in this case, a plurality of processing parameters (the two parameters tan α and c) interrelated to each other are provided in the conversion tables 412 as the image processing parameters. For example, when the value of tan α is increased, an overshooting phenomenon is likely to occur. In this case, the predetermined value c is set at a smaller value. FIGS. 6A through 6C illustrate such processing parameters (tan α and c) more specifically.

FIG. 6A illustrates an example of the conversion table 412 when the parameter tan α has a smaller value of tan α1, and the parameter c has a value of c1. FIG. 6B illustrates an example of the conversion table 412 when the parameter tan α has a larger value of tan α2, and the parameter c has a value of c2. In this case, the predetermined value c1 illustrated in FIG. 6A is larger than the predetermined value c2 illustrated in FIG. 6B. FIG. 6C illustrates an example of the relationship between the parameters tan α and c as a graph.

Figure 7:
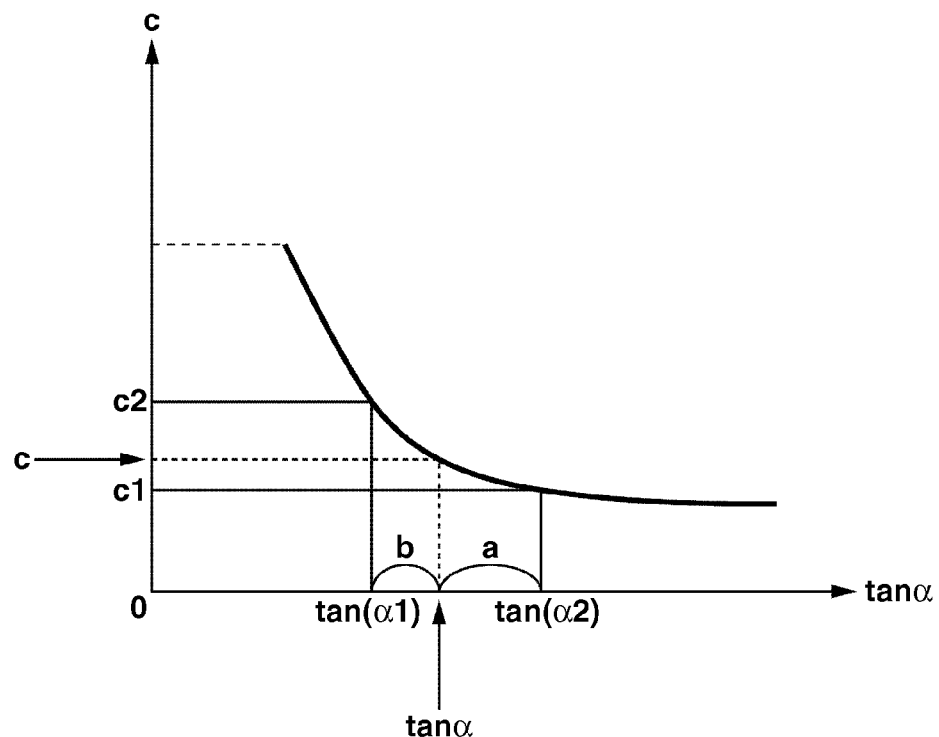
FIG. 7 schematically illustrates an example of interpolation of processing parameters (i.e., tan α and a predetermined value C) interrelated to each other.

FIG. 7 schematically illustrates an example of interpolation of the processing parameters (tan α and the predetermined value c) interrelated to each other.

For example, when the mixing ratio between the first sample image and the second sample image is designated by the operator to be a:b, the system control unit 112 (or the image processing unit 113) sets the parameter tan α by interpolating a value of this parameter between the values tan α1 and tan α2 by using a mixing ratio of a:b. Subsequently, the system control unit 112 (or the image processing unit 113) sets the predetermined value c corresponding to the set value of the parameter tan α according to a graph illustrated in FIG. 7. More particularly, because the predetermined value c is not independent of the parameter tan α, only the value of the parameter tan α is obtained by interpolation. Then, the predetermined value c is obtained according to the relationship between the predetermined value c and the obtained value of the parameter tan α.

First, the system control unit 112 (or the image processing unit 13) sets one (tan α) of processing parameters, which is selected from a plurality of processing parameters (tan α and the predetermined value c), based on the designated mixing ratio. Then, the system control unit 112 (or the image processing unit 113) sets the other parameter (i.e., the predetermined value c) according to a corresponding relationship with the one processing parameter (tan α). Thus, the image processing parameters (the conversion tables 412) are set.

In the above example, the two processing parameters are described as the processing parameters interrelated to each other. However, sometimes, three or more processing parameters can be related to one another. The processing parameters interrelated to one another are collectively set as one set of image processing parameters (or a single processing parameter). Then, one of the processing parameters is selected as a representative processing parameter, and used in the interpolation. All of other unselected processing parameters are set according to the relationship with the representative interpolated processing parameter.

The image processing parameters can be set in this manner. Similarly, photographing conditions can be set. However, the setting of the photographing conditions differs from that of the image processing parameters in sample images to be input. Therefore, a phantom is preliminarily photographed under a plurality of standard photographing conditions. The phantom is a simulated subject formed to have the same degree of X-ray transmission as that of X-ray transmission of an actual subject (or have the same X-ray transmission factor as that of the actual subject).

Figure 8:
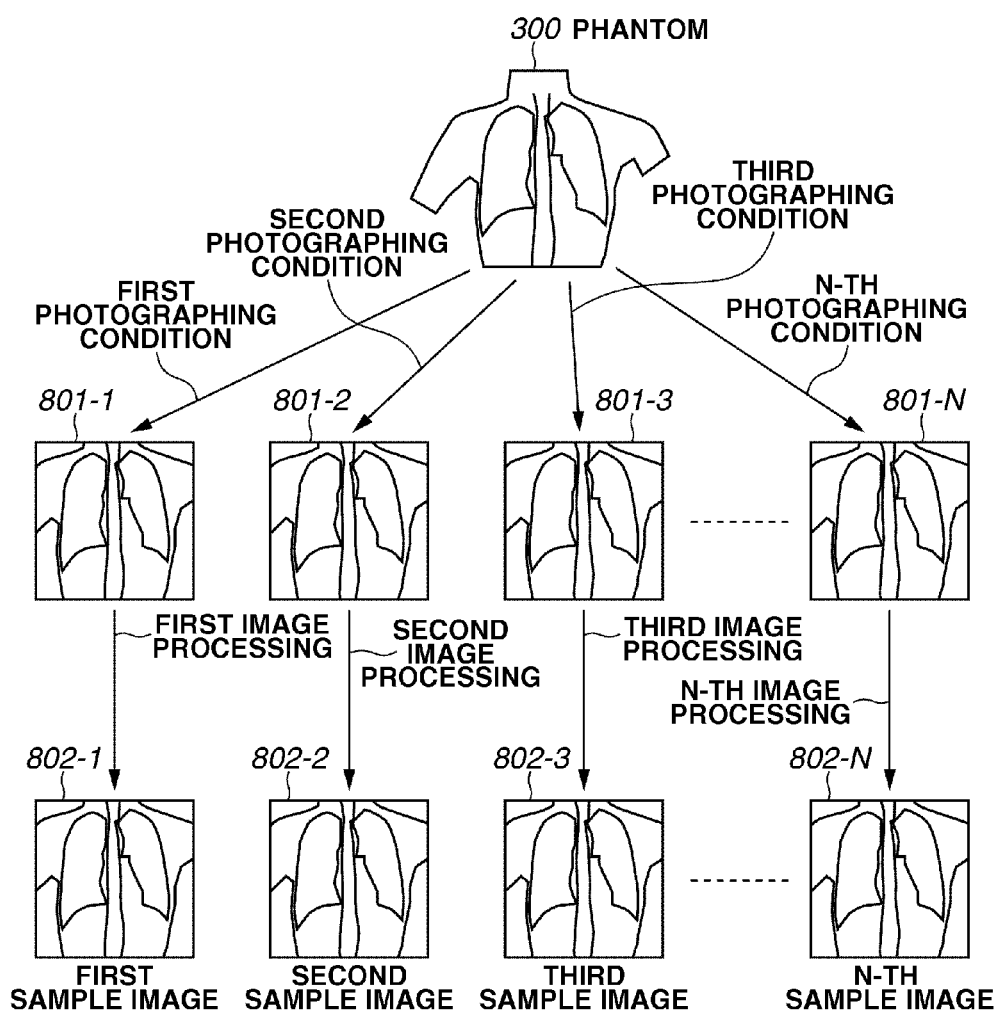
FIG. 8 illustrates an example of sample images, each of which is associated with a photographing condition, that are used in the X-ray image processing apparatus according to the exemplary embodiment of the present invention.
Figure 9:
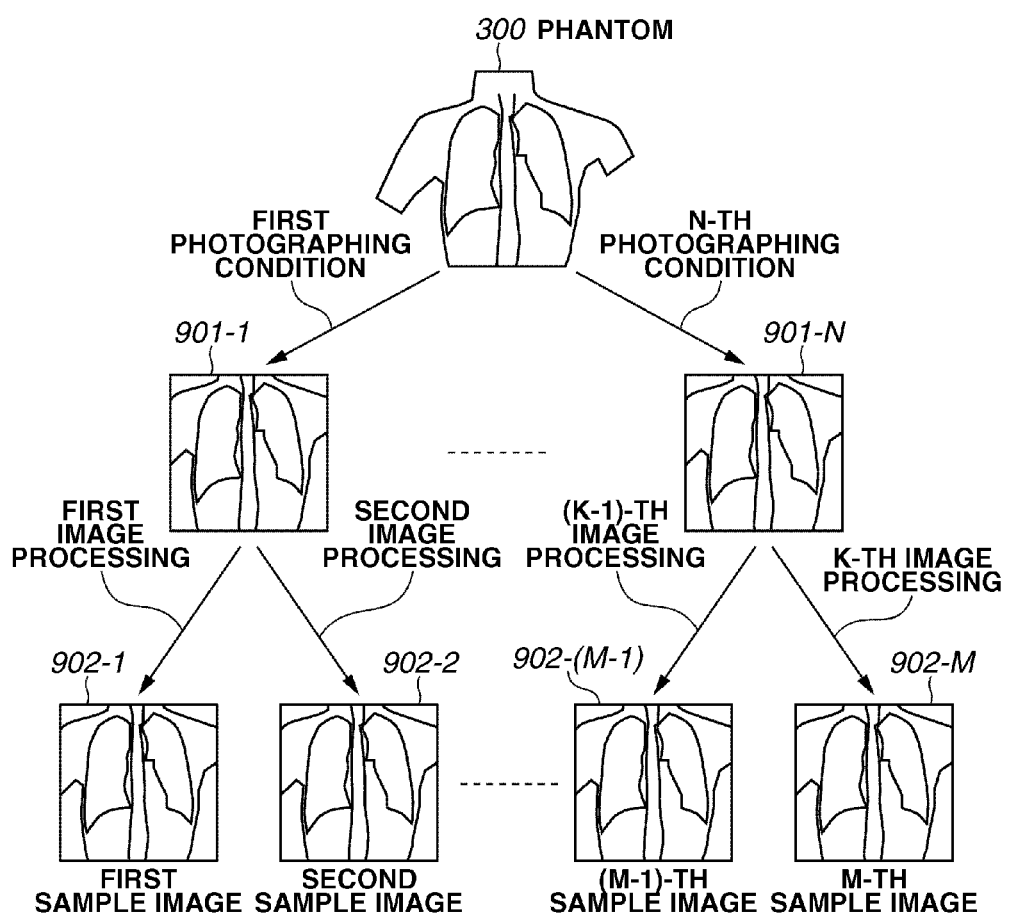
FIG. 9 illustrates another example of sample images, each of which is associated with a photographing condition, that are used in the X-ray image processing apparatus according to the exemplary embodiment of the present invention.

FIGS. 8 and 9 each illustrates an example of sample images which are used in the X-ray image processing apparatus 110 according to the exemplary embodiment of the present invention and which are related in photographing conditions to one another.

FIG. 8 illustrates each of images 801-1 through 801-N formed by photographing a phantom 300 with X-rays under photographing conditions (i.e., a first photographing condition through an N-th photographing condition) each corresponding thereto. Each of the images 802-1 through 801-N, which is photographed under the corresponding photographing condition, is subjected to image processing (i.e., one of first image processing through N-th image processing) using one or more optimal image processing parameters. Resultant images are obtained as sample images (a first sample image 802-1 through N-th sample image 802-N (hereinafter sometimes referred to as sample images 802)).

FIG. 8 illustrates an example of generating each single sample image 802 by performing image processing, which uses one image processing parameter, on an image of a phantom 300 photographed under one photographing condition. However, the present invention is not limited to this exemplary embodiment illustrated in FIG. 8. The present invention can be applied to another embodiment in which two or more sample images 902 are generated for each one of the images 901 each obtained by photographing a phantom 300 under a photographing condition and by applying a plurality of different image processing to each image 901, as illustrated in FIG. 9.

More specifically, similar to FIG. 8, FIG. 9 illustrates images (901-1, 901-2, . . . , and 901-N) of phantom 300 photographed with X-rays and each under different photographing conditions (i.e., a first photographing condition, . . . , an N-th photographing condition). Two sample images (the images 902-1 and 902-2) are generated by performing different two image processing operations respectively (e.g., first and second image processing operations) on one image of the phantom 300 (the image 901-1) photographed under a condition.

Thus, according to these examples, as illustrated in FIGS. 8 and 9, each sample image is related to the photographing condition under which the image of the phantom is photographed. In this case, the system control unit 112 sets the photographing condition used at the photographing of an X-ray image, based on the designated mixing ratio, in addition to the above image processing parameters.

Then, the system control unit 112 controls the X-ray generator 101 via the X-ray control unit 103 based on the set photographing conditions to thereby control photographing of X-ray images. The system control unit 112 for controlling this photographing corresponds to a photographing control unit.

Hereinafter, a practical example of the photographing conditions and the setting of the photographing conditions utilizing interpolation are described. In this example, values of a tube voltage and a tube current of an X-ray tube of the X-ray generator 101 are set as the photographing conditions.

Figure 10:
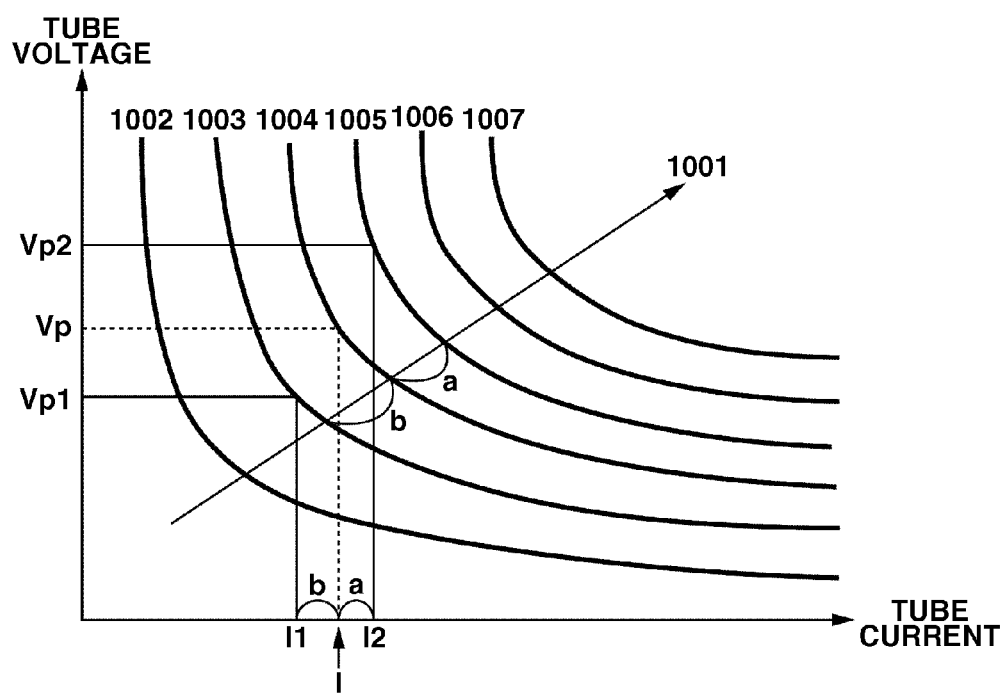
FIG. 10 schematically illustrates interpolation of photographing conditions performed in the X-ray image processing apparatus according to the exemplary embodiment of the present invention.

FIG. 10 schematically illustrates the interpolation of the photographing conditions, which is performed in the X-ray image processing apparatus 110 according to the present embodiment.

In FIG. 10, an axis of abscissa represents the tube voltage, while an axis of ordinate represents the tube current. The curves 1002 through 1007 illustrated in this graph represent combinations of the tube voltage and the tube current which provide the same X-ray dosage. As the reference numerals indicating the curves become larger along the arrow 1001, the X-ray dosage increases.

The photographing conditions corresponding to the first sample image are that the tube voltage is Vp1, while the tube current is I1. The photographing conditions corresponding to the second sample image are that the tube voltage is Vp2, while the tube current is I2. Then, the interpolation of the X-ray dosage is performed. The X-ray dosage corresponding to the first sample image changes along the curve 1003. The X-ray dosage corresponding to the second sample image changes along the curve 1005. Accordingly, when the mixing ratio between the first sample image and the second sample image is designated to be a:b, an intermediate curve 1004 passing through a position at which a ratio of a distance between the curve 1003 and the intermediate curve 1004 to a distance between the intermediated curve and the curve 1005 is b:a.

In the example illustrated in FIG. 10, the curve 1004 is the intermediate curve to be obtained. When there is no curve passing through such a position, a curve passing through such a position is generated by interpolation between the two curves closest to such a position. In this example, an adjusted tube current I is obtained by selecting the tube current as a representative photographing parameter and performing interpolation between tube currents I1 and I2 by a ratio of a:b.

Then, an adjusted tube voltage Vp corresponding to this adjusted tube current I is obtained from the corresponding curve 1004. Thus, similar to the image processing parameters, the photographing conditions can be set according to the photographing conditions of the first sample image and the second sample image and a mixing ratio there between.

As described above, the image processing parameters and the photographing conditions can be set by interpolation among a plurality of sample images and a mixing ratio there among. When an X-ray image is employed as an image to be processed, the X-ray image is used for diagnosis or the like. In order to achieve objects of the diagnosis, sometimes, special limiting conditions are set on the image processing. For example, a situation in which densities of X-ray images of subjects (patients) 200 discretely differ from one another is inconvenient for the diagnosis. Thus, a density, i.e., a pixel value at a specific position in a photographed area of each subject is set to be equal to that at the corresponding position in the photographed area of each of the other subject.

Figure 11:
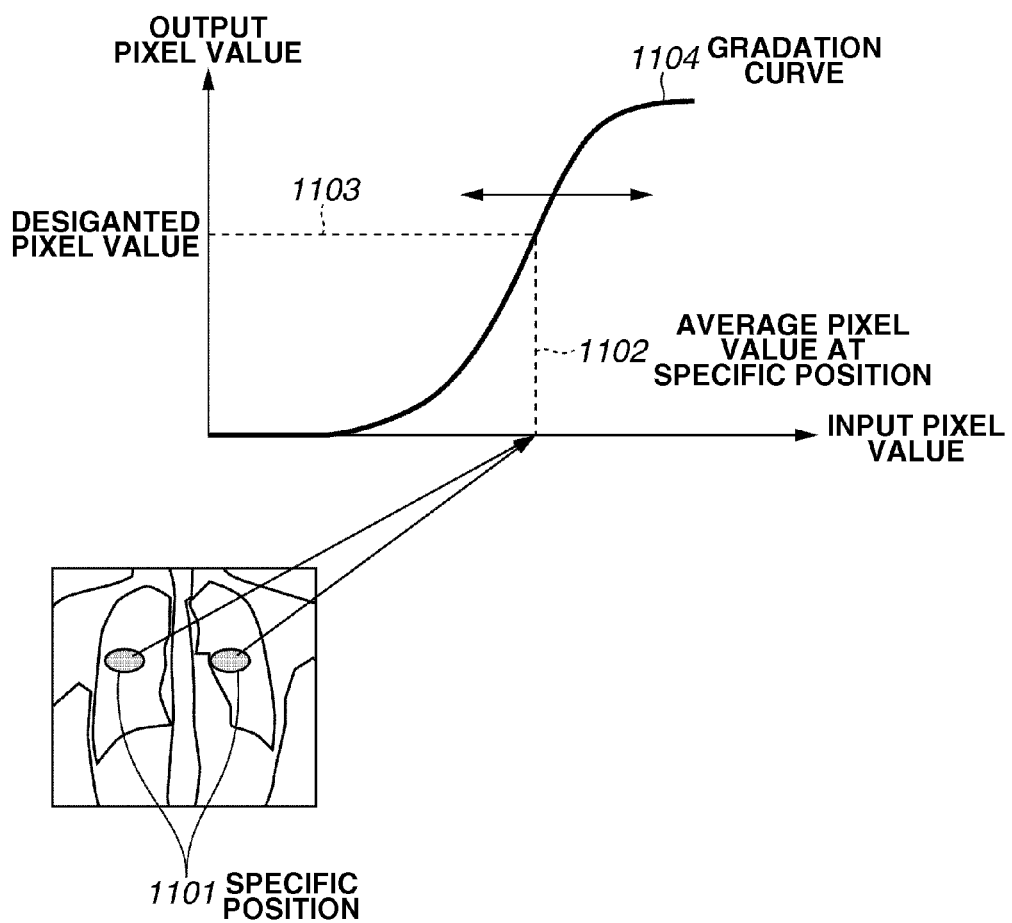
FIG. 11 conceptually illustrates image processing of an X-ray image performed in the X-ray image processing apparatus according to the exemplary embodiment of the present invention.

FIG. 11 conceptually illustrates image processing of an X-ray image, which is performed in the X-ray image processing apparatus 110 according to the present embodiment.

A specific position 1101 in an X-ray image illustrated in FIG. 11 is a region of a lung field in a highest density when a front region of a chest of the subject is photographed. For diagnosis, it is necessary that a density at the highest density region of the lung field (i.e., the specific position 1101) should be a predetermined pixel value, independent of the subjects (i.e., the patient).

Thus, the X-ray image is analyzed by the system control unit 112 (or the image processing unit 113) to obtain an average pixel value of the highest density region (i.e., at the specific position 1101) of the lung field. The obtained average pixel value corresponds to an average pixel value 1102 at the specific position 1101 illustrated in FIG. 11. Then, the system control unit 112 (or the image processing unit 113) laterally shifts a gradation curve 1104 such that the average pixel value 1102 at the specific position 1101 is a certain designated pixel value (e.g., a designated pixel value 1103 illustrated in FIG. 11). Thus, the highest density region of the lung field can be set to have a predetermined density.

In addition, in order to perform diagnosis, it is necessary to assure lowest contrast over the entire image. A problem occurs, for example, when a range of pixel values, in which gradation conversion can be performed, is changed by variously changing a parameter corresponding to the contrast in gradation conversion processing.

Figure 12:
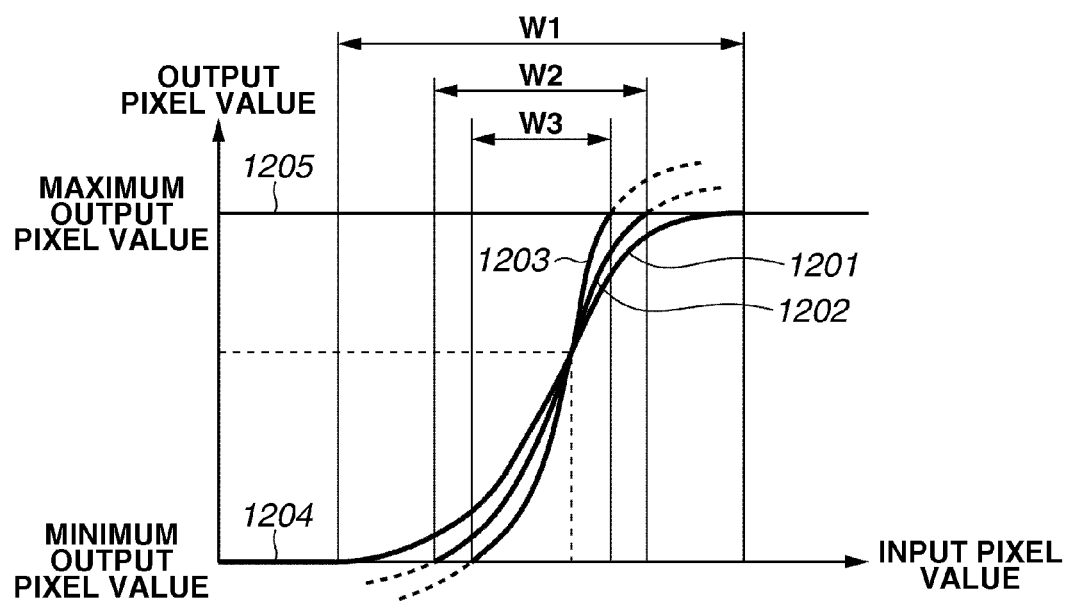
FIG. 12 illustrates changes in gradation curve due to changes in contrast according to the exemplary embodiment of the present invention.

FIG. 12 illustrates changes of gradation curve due to changes in contrast according to the present embodiment. A gradation curve 1201 illustrated in FIG. 12 is assumed a standard gradation curve. An input pixel value is converted according to this gradation curve 1201 into an output pixel value. A range of input pixel values, in which output pixel values fall within a range between a minimum output pixel value 1204 and a maximum output pixel value 1205, is a range W1.

On the other hand, when the processing parameter for the contrast is changed by interpolation, the gradation curve is obtained as those 1202 and 1203 illustrated in FIG. 12. At that time, a range of input pixel values for the gradation curve 1202 is a range W2. A range of input pixel values for the gradation curve 1203 is a range W3.

When the contrast is enhanced in this way, the range of input pixel values, in which the output pixel values fall within the range between the minimum output pixel value 1204 and the maximum output pixel value 1205, is narrowed. In this case, for an input pixel value in a range in which corresponding output pixel value does not fall within the range between the minimum output pixel value 1204 and the maximum output pixel value 1205, a sufficient contrast is not obtained at all. Thus, an output image including white and black voids is formed. Such an image is unsuitable for diagnosis.

Accordingly, a method for setting the density at the specific position to be a predetermined pixel value and for assuring the lowest contrast over the entire image is described below.

Figure 13A:
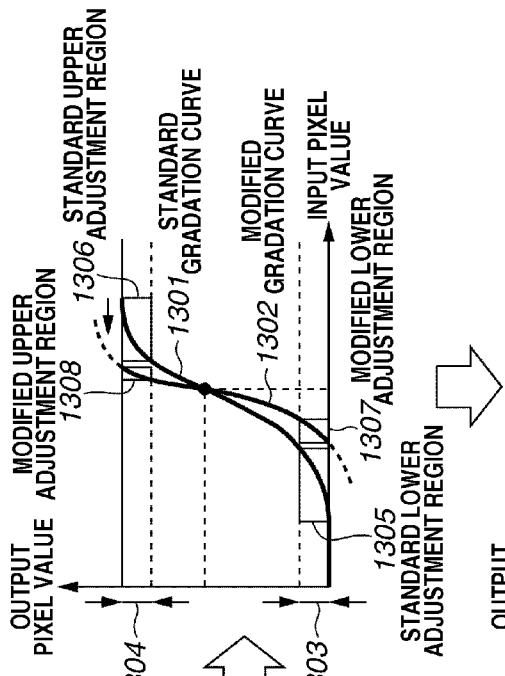
FIGS. 13A, 13B, and 13C illustrate an example of a method for assuring a minimum contrast according to the exemplary embodiment of the present invention.
Figure 13B:
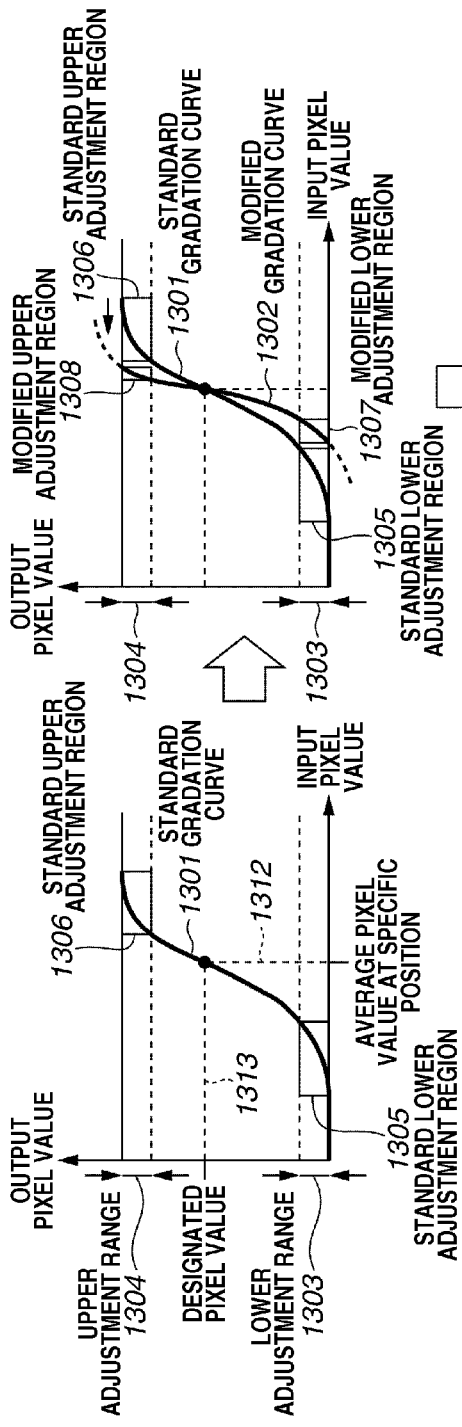
Figure 13C:
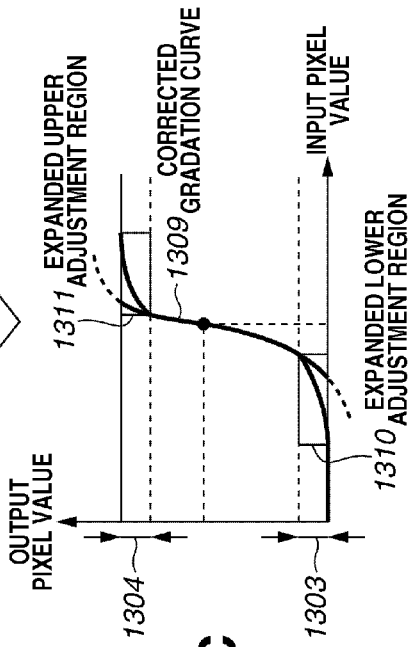

FIGS. 13A, 13B, and 13C conceptually illustrate an example of the method for assuring the lowest contrast according to the present embodiment.

FIG. 13A illustrates a standard gradation curve 1301 representing standard gradation levels. In this case, it is assumed that a range of input pixel values, in which output pixel values fall within a predetermined range according to the standard gradation curve 1301, is sufficiently wide, and that the lowest contrast is assured without generating black and white voids for an output image of an input X-ray image. First, as described above, such a standard gradation curve 1301 is laterally shifted such that an average pixel value 1312 at the specific position becomes a designated pixel value 1313. Thereby, the limiting condition is satisfied, in which the density at the specific position is always a predetermined pixel value.

Next, in order to assure the lowest contrast (this contrast is assumed to be equal to or higher than a predetermined threshold) over the entire image, first, a lower adjustment range 1303 and an upper adjustment range 1304 are set for the standard gradation curve 1301. At that time, a region of the set lower adjustment range 1303 and a region of the set upper adjustment range 1304 each including a standard adjustment region 1301 are set as a standard lower adjustment region 1305 and a standard upper adjustment region 1306, respectively.

In addition, as illustrated in FIG. 13B, the contrast of the standard gradation curve 1301 is changed to a contrast of a modified gradation curve 1302 by using interpolation. At that time, a region of the lower adjustment range 1303 and that of the upper adjustment range 1304 each including the modified gradation curve 1302 are set as a modified lower adjustment region 1307 and a modified upper adjustment region 1308, respectively. The modified lower adjustment region 1307 and the modified upper adjustment region 1308 are much narrower than the standard lower adjustment region 1305 and the standard upper adjustment region 1306. Thus, the narrow modified lower adjustment region 1307 and the narrow modified upper adjustment region 1308 are expanded using the standard lower adjustment region 1305 and the standard upper adjustment region 1306.

To this end, first, a part of the modified gradation curve 1302, which is included in the modified lower adjustment region 1307, and another part of the modified gradation curve 1302, which is included in the modified upper adjustment region 1308, are removed. Then, each of the standard lower adjustment region 1305 and the standard upper adjustment region 1306 is laterally expanded so as to include respectively the modified lower adjustment region 1307 and the modified upper adjustment region 1308. Thus, as illustrated in FIG. 13C, an expanded lower adjustment region 1310 and an expanded upper adjustment region 1311 are obtained.

Parts of the standard gradation curve 1301, which are included respectively in the standard lower adjustment region 1305 and the standard upper adjustment region 1306, are similarly and laterally expanded. Then, the expanded parts of the standard gradation curve 1301 are used instead of the removed parts of the modified gradation curve 1302. A gradation curve created in this manner is a corrected gradation curve 1309 illustrated in FIG. 13C.

A range of input pixel values, in which output pixel values fall within the similar predetermined range thereof as used in the case of using the standard gradation curve and the new contrast is obtained by interpolation, can be implemented. Thereby, the lowest contrast can be assured over the entire image without generating black and white voids for the input X-ray image.

Various processing illustrated with reference to FIGS. 11 through 13C are executed by the system control unit 112 or the image processing unit 113. As described with reference to FIGS. 11 through 13C, according to the present embodiment, the two limiting conditions are satisfied, in which the density at the specific position in the image is set to be a predetermined value when the image processing parameters are set, and in which the contrast of the density at the specific position is set to be equal to or higher than the predetermined threshold. The present invention includes a case where one of the two limiting conditions is satisfied.

As described above, first, the X-ray image processing unit 110 generates a plurality of sample images subjected to different image processing and displays the generated sample images on the diagnosis monitor 104. When the operator designates a mixing ratio among the plurality of the sample images displayed on the diagnosis monitor 104, the image processing parameters used for image processing of an X-ray image are set on the basis of the designated mixing ratio.

Subsequently, new sample images are generated by performing image processing using the set image processing parameters. The generated new sample images are displayed on the diagnosis monitor 104. When the operator gives permission to the image processing apparatus 110, image processing of the X-ray image is performed on the basis of the image processing parameters.

With such a configuration, a desired image by an operator can be acquired by performing a simple operation without performing a complex operation. Especially, when an image to be processed is an X-ray image, an image providing high diagnosis capability to the apparatus can be acquired. Therefore, accuracy of diagnosis by a medical-doctor can be enhanced.

According to the present embodiment, the number of sample images to be preliminarily prepared can considerably be reduced, as compared with that of the conventional apparatus. In addition, an image close to a desired image by an operator can easily be generated. Each time an operator changes the mixing ratio among the sample images, the image processing parameters are newly set. Then, images generated with image processing using the image processing parameters are displayed on the diagnosis monitor 104. Thereby, the operator can easily determine by observing the images obtained as a result of changing the mixing ratio among the sample images whether the obtained image is close to the desired image.

According to the present embodiment, one of the image processing parameters related to one another is selected and used as an independent image processing parameter. In addition, a new image processing parameter is generated from the selected one image processing parameter using a designated mixing ratio.

New image processing parameters corresponding to the other ones of image processing parameters that are related to the selected image processing parameter are set using the corresponding relationship with the selected one image processing parameter. Thus, an intermediate image with a visually designated mixing ratio can be generated by setting the new image processing parameters in this manner and performing image processing.

For example, an image of the subject (the patient) 200 can be photographed with the lowest X-ray dosage by associating photographing conditions, which are used when a sample image is photographed, with the sample images displayed on the diagnosis monitor 104.

According to the present embodiment, sample images are created using images of the same subject, which are photographed under a plurality of photographing conditions, and using also a plurality of image processing parameters. Then, the sample images are displayed on the diagnosis monitor 104. When an operator designates a mixing ratio among the plural sample images, image processing parameters and photographing conditions are newly set on the basis of the designated mixing ratio. Then, photographing and image processing are performed on the basis of the set photographing conditions and the image processing parameters. Thereby, not only the image processing parameters but the photographing conditions can be set simply and appropriately.

In addition, the image processing parameters are determined so as to meet the limiting-conditions to X-ray images. Thereby, the image processing parameters can be set to obtain X-ray images effective for diagnosis.

Each step of the X-ray image processing method to be executed by the X-ray image processing apparatus 110 according to the present embodiment can be implemented by executing a program code stored in a random access memory (RAM) or a read-only memory (ROM) by a central processing unit (CPU) of a computer. The program code itself and a computer-readable storage medium, which stores the program code, are included in the present invention.

The program code is provided to a computer by being recorded on a storage medium, for example, a compact disk-read-only memory (CD-ROM), or by being transmitted via various transmission medium. In addition to a CD-ROM, a flexible disk, a hard disk, a magnetic tape, a magneto-optical disk, a nonvolatile memory card, and the like can be used as the storage medium which stores the program code. On the other hand, a communication medium used in a system of a computer network (a local area network (LAN), a wide area network (WAN), a wireless communication network, or the like) for supplying program information by being propagated as a carrier wave can be used as the transmission medium for transmitting the program code. As a communication medium, such as an optical fiber, and a wireless circuit can be used.

The present invention is not limited to embodiments in which the functions of the X-ray image processing apparatus 110 according to the present invention can be achieved by executing a supplied program code by a computer. In a case where the functions of the X-ray image processing apparatus 110 are achieved by the program code working together with an operating system (OS) running on the computer, other application software, or the like, such a program code is included in the present invention. In addition, in a case where a part or all of processing is performed by executing the program code by a function expansion board or a function expansion unit of the computer to achieve the functions of the X-ray image processing apparatus 110 according to the present embodiment, such a program code is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus for performing image processing on an image to be processed, comprising:
a display control unit configured to display on a display unit a plurality of sample images generated by changing one or more image processing parameters;
a mixing ratio designating unit configured to designate a mixing ratio among the plurality of sample images; and
an image processing unit configured to perform the image processing of the image based on the designated mixing ratio.

2. The image processing apparatus according to claim 1, wherein the image processing unit generates a new sample image by performing image processing using the image processing parameter set on the basis of the mixing ratio designated by the operator,
wherein the display control unit further performs a control operation for displaying the new sample image on the display unit, and
wherein the image processing unit performs image processing of the image when the new sample image displayed on the display unit is permitted based on the one or more image processing parameters used when the new sample image is generated.

3. The image processing apparatus according to claim 1, further comprising a setting unit configured to set the image processing parameter according to a change of the mixing ratio, each time the mixing ratio at which the sample images are mixed is changed and designated,
wherein the image processing unit generates the new sample image according to the image processing parameter, each time the image processing parameters are set by the setting unit, and
wherein the display control unit further performs a control operation for displaying the new sample image on the display unit, each time the new sample image is generated by the image processing unit.

4. The image processing apparatus according to claim 3, wherein a plurality of processing parameters interrelated to one another is included in the image processing parameters,
wherein the setting unit sets a selected one of the plurality of processing parameters based on the designated mixing ratio, and
wherein the setting unit sets the image processing parameters by setting other processing parameters according to relationship with the selected one of the plurality of processing parameters.

5. The image processing apparatus according to claim 3, further comprising a photographing control unit configured to control photographing of the image to be processed,
wherein each of the sample images is associated with one or more photographing conditions used when the sample images are photographed,
wherein the setting unit further sets photographing conditions used when the image to be processed is photographed, based on the designated mixing ratio, in addition to the one or more image processing parameters, and
wherein the photographing control unit performs a control operation for photographing the image to be processed, based on the photographing conditions set by the setting unit.

6. The image processing apparatus according to claim 3, wherein the setting unit sets the image processing parameter, based on the designated mixing ratio, using the one or more image processing parameters corresponding to the plurality of simple images.

7. The image processing apparatus according to claim 3, wherein the image to be processed, and the sample images are X-ray images obtained by photographing using X-rays, and
wherein the setting unit sets the image processing parameter such that at least one of limiting conditions, in which a density at a specific position in the X-ray image has a predetermined value, and in which a contrast of the X-ray image is equal to or higher than a predetermined threshold, is satisfied.

8. The image processing apparatus according to claim 3, further comprising an image selection processing unit configured to select a plurality of sample images from the plurality of sample images displayed on the display unit,
wherein the setting unit sets the image processing parameter based on the designated mixing ratio among the plurality of selected sample images.

9. An image processing method for performing image processing on an image to be processed, comprising:

displaying a plurality of sample images generated by changing one or more image processing parameters;

designating a mixing ratio among the plurality of sample images; and performing the image processing of the image to be processed based on the designated mixing ratio.

10. A non-transitory computer-readable medium storing a computer program of instructions that cause the computer to perform a method comprising:

displaying a plurality of sample images generated by changing one or more image processing parameters;

designating a mixing ratio among the plurality of sample images; and performing the image processing of the image to be processed based on the designated mixing ratio.

* * * * *